United States Patent [19]

Yamaoka et al.

[11] Patent Number: 4,504,043
[45] Date of Patent: Mar. 12, 1985

[54] APPARATUS FOR COAL-GASIFICATION AND MAKING PIG IRON

[75] Inventors: Hideyuki Yamaoka, Chiba; Michiharu Hatano, Sawara; Tomio Miyazaki, Hasaki; Teruhisa Shimoda, Itako; Koji Oki, Omigawa, all of Japan

[73] Assignee: Sumitomo Metal Industries, Ltd., Osaka, Japan

[21] Appl. No.: 497,420

[22] Filed: May 24, 1983

Related U.S. Application Data

[62] Division of Ser. No. 372,147, Apr. 27, 1982, abandoned.

[30] Foreign Application Priority Data

| Jun. 10, 1981 [JP] | Japan | 56-89275 |
| Jun. 22, 1981 [JP] | Japan | 56-96390 |
| Dec. 28, 1981 [JP] | Japan | 56-209851 |
| Apr. 2, 1982 [JP] | Japan | 57-53703 |

[51] Int. Cl.³ .................................. F27B 19/00
[52] U.S. Cl. .............................. 266/160; 48/92; 75/38; 266/144; 266/156; 266/218
[58] Field of Search .................. 266/144, 160, 218; 75/38; 48/92

[56] References Cited

U.S. PATENT DOCUMENTS

| 3,948,640 | 4/1976 | Elvander et al. | 75/26 |
| 4,310,350 | 1/1982 | Santen | 75/11 |
| 4,340,420 | 7/1982 | Santen et al. | 75/11 |

FOREIGN PATENT DOCUMENTS

2077767 12/1981 United Kingdom .................. 75/11

Primary Examiner—M. J. Andrews
Attorney, Agent, or Firm—Burns, Doane, Swecker and Mathis

[57] ABSTRACT

In a melting/gasifying furnace including a coke-filled layer, coal is gasified by oxygen blown through tuyeres into a hot reducing gas which is caused to ascend through the coke-filled layer so as to melt reduced iron supported on the top of the coke-filled layer. The resulting molten iron flows down through the coke-filled layer, and is collected in the lowermost region of the coke-filled layer and discharged therefrom, while the hot gas is recovered. The thus recovered gas is fed into a shaft reduction furnace to reduce iron ores, and the thus formed reduced iron is supplied into the melting-/gasifying furnace. In addition to the coal, a variety of fuels mainly comprising carbon and hydrogen such as heavy oil, natural gas, etc. are used for gasification. The fuel is blown through the tuyeres and/or charged through middle openings disposed above the tuyeres.

25 Claims, 6 Drawing Figures

APPARATUS FOR COAL-GASIFICATION AND MAKING PIG IRON

This application is a division, of application Ser. No. 372,147, filed Apr. 27, 1982 now abandoned.

FIELD OF THE INVENTION

The present invention relates to a process and apparatus for the production of pig iron by melting semi-reduced iron or reduced iron with high efficiency using fuel composed mainly of carbon and hydrogen and, at the same time, of a reducing gas composed mainly of carbon monoxide and hydrogen. The furnace according to the present invention is hereinafter referred to as the melting/gasifying furnace.

The present invention relates further to a process and system for the production of pig iron, which are carried out and applied with high productivity and thermal efficiency comparable to those of a blast furnace process and make the use of raw materials of low quality possible by using a combination of the melting gasifying furnace capable of gasifying coal etc. and melting reduced iron, and a reduction furnace for reducing iron ores.

Still further, the present invention relates to a process and apparatus in which the melting/gasifying furnace is incorporated so as to produce a reducing gas from fuel composed mainly of carbon and hydrogen with good efficiency.

BACKGROUND OF THE INVENTION

The prior art concerning the melting of reduced iron by a reducing gas generated in situ in a furnace and the recovery of the reducing gas includes followings:

1. Cupola

Coke is burned by hot air to generate a hot gas which is then passed upwardly through a coke-filled layer to melt an amount of iron retained therewith. The by-product gas obtained is a low-calorie gas rich in $N_2$ and $CO_2$.

2. Process of Korfstahl, West Germany (JP Openlaying No. 55-94408)

Coal and hydrocarbon-type fuel are gasified by oxygen and steam to form a hot gas which is, in turn, passed upwardly through a coal char fluidized bed to melt semi-reduced iron on the top thereof, and the hot gas is recovered.

3. Process of Stiftersen, Sweden (JP Openlaying No. 49-110519)

Oxygen and hydrocarbon-type fuel, together with semi-reduced iron, are blown into a coke-filled layer or carbonaceous reducing agent-filled layer in which the oxygen and the fuel is burned to generate a hot gas, by which iron is melted. Gas reformation is then effected by steam and carbon, using the sensible heat of the hot gas.

These processes of the prior art have the following disadvantages: In the cupola process, the by-product gas obtained is a low-calorie gas rich in $N_2$ and $CO_2$, and cannot be used as a reducing or fuel gas.

The second process designed to melt semi-reduced iron resorts to a system in which a coal-char fluidized bed is formed, and an amount of semi-reduced iron on top thereof is heated and melted by the ascending hot gas.

However, the coal char fluidized bed is unstable and poor in the semi-reduced iron retaining power. Hence, it is not expected to bear the semi-reduced iron on the coal-char fluidized bed for a longer period of time. As a result, the iron should be melted in the possible shortest time with a large amount of the hot gas, which means that the thermal efficiency of melting is low.

The third process resorts to a system in which semi-reduced iron, together with oxygen and hydrocarbon fuel, is blown into a carbonaceous reducing agent-filled layer through tuyeres to burn the hydrocarbon, fuel with oxygen thereby obtaining the hot gas, and the iron is melted by the sensible heat of the resulting hot gas. The gas consumed for melting of semi-reduced iron has a temperature higher than the melting point thereof. Therefore, the combustion heat of oxygen and hydrocarbons is not effectively used for melting of sem-reduced iron. As well-known in the art, the production of pig iron by reduction and melting of iron ores is carried out according to two production systems; one wherein iron ores are gas-reduced in the massive state followed by melting, and the other wherein iron ores are heated and melted and thereafter reduced with the aid of a solid reducing agent. The former system is typically the blast furnace process, and the latter is typically the melting/reducing process.

However, the melting/reducing process has the disadvantages that the reduction of molten iron ores with the solid reducing agent involves a considerably endothermic reaction which renders a stable supply of heat into a reaction bath very difficult, and that there is a marked erosion of refractory materials due to molten iron ores. Hence, in the art no process renders the productivity and economy comparable to those of the blast furnace process.

Like the blast furnace process, on the other hand, the production system in which iron ores are gas-reduced and thereafter melted is advantageous in that the gas reduction of iron ores is a certain exothermic reaction which proceeds in a stable manner, and in that the melt has a reduced content of iron oxides thus posing little or no problem in connection with the erosion of refractory materials in comparison with the melting/reducing process. In addition, the blast furnace process exhibits a very high thermal efficiency due to the fact that the gas-reduction and melting of iron ores are carried out in the same vessel, and reduces the consumption of energy if a by-product gas is recovered for another purposes.

As well-known in the art, however, the blast furnace process requires the use of coke of high quality, such as with high strength or low reactivity, so as to ensure good permeability in the furnace and stable descending of the stock therein. The production of these cokes inevitably needs a feed of coking coal of high quality and high energy for coking. The agglomerated iron ores used should also have a high strength and excel in the softening properties at high temperatures.

There is now an increasing demand for the process of the production of pig iron with the productivity and thermal efficiency bearing comparison with those of the blast furnace process as well as with the possibilities of applying raw materials of low quality. Such a process will be of great significance with the future of natural resources in mind and there have been many attempts to investigate a new process.

In the process for the production of gas by combustion of solid fuels such as coke and coal, in general, the higher the reaction temperature, the better the gasification efficiency will be. With the prior art gasifying furnace, however, it is impossible to effect high-temperature combustion since, as the reaction temperature rises, the resulting ashes are converted into a melt which is very difficult to treat. A typical example of the gasifying process as referred to above is the Lurgi process using a static bed furnace operated under pressure. The Lurgi process is characterized in the use of a static bed furnace, and has the advantages that the gasification temperature is as low as 1100° C.; the removal of ashes is relatively easy; the amount of dust generated is by far less than that in the case of a fluidized bed furnace; and etc. However, this system has the following demerits: The yield of methane is low, resulting in that an appreciable burden is imposed on methanization so that no high calorie-gas is obtainable; neither fine coal nor coking coal is used; difficulties are encountered in the up-scaling of the system size; and the like. In this connection, it is noted that the combustion temperature in the Lurgi process is as low as 1100° C., with the gasification efficiency being low as a consequence, and the resulting gas has a $CO_2$ content of about 30%, thus remarkedly rich in $CO_2$.

OBJECT OF THE INVENTION

An object of the present invention is to provide a novel process and apparatus (a melting/gasifying furnace) for generating a reducing hot gas in situ to melt reduced iron and for recovering the reducing gas.

Another object of the present invention is to provide a process for producing pig iron which makes it possible to decrease the overall energy consumption with good efficiency by recovering a useful reducing gas obtained as a by-product.

Yet another object of the present invention is to provide a novel process and system for making pig iron starting from iron ores by effecting the production of reduced iron and melting of the resultant reduced iron with the aid of a reducing gas generated in the melting-/gasifying furnace, which are capable of saving in energy, decreasing the coke ratio and using raw materials with a lawer quality.

Still further orject of the present invention is to provide a process and apparatus for the efficient production of a reducing gas composed mainly of carbon monoxide and hydrogen by employing fuel composed mainly of carbon and hydrogen such as solid fuel, for instance, coal and coke.

Other objects of the present invention will become apparent from a reading of the following explanation.

SUMMARY OF THE INVENTION

In what follows, the term "reduced iron" shall comprise semi-reduced iron, unless otherwise stated. The term "melting/gasifying furnace "shall generally describe a furnace essentially designed to gasify in situ fuel into a reducing hot gas by oxygen, to melt reduced iron with the aid of a coke-filled layer, and to recover the reducing gas, unless otherwise specified in the disclosure.

Unlike the aforesaid conventional processes, the present invention contemplates burning and gasifying an amount of fuel mainly comprising carbon and hydrogen by oxygen into a reducing hot gas composed mainly of CO and $H_2$ in a melting/gasifying furnace and melting reduced iron with the aid of a coke-filled layer into molten iron by making use of the sensible heat of said hot gas.

More specifically, the (first) process for the production of molten iron according to the present invention uses the melting/gasifying furnace provided therein with a coke-filled layer including therein voids in which the gas flows countercurrently to the molten iron and slag, and the coke-filled layer bearing an amount of unmolten iron on the top thereof, and comprises burning and gasifying fuel mainly comprising carbon and hydrogen by oxygen and, optionally, steam in the lower region of the coke-filled layer to from a hot gas mainly comprising carbon monoxide and hydrogen, causing the hot gas to ascend through the coke-filled layer to melt the reduced iron followed by the recovery of the hot gas, and causing the molten iron formed by melting of the reduced iron and the iron oxide-containing slag to flow down in the countercurrent contact with the upward hot gas flowing through the coke-filled layer, thereby obtaining molten pig iron.

In the countercurrent contact, the iron oxides and other metal oxides in the slag are reduced by coke, whereon the carbon of the coke is dissolved in the molten iron. The resulting molten pig iron and slag are collected in the lower most region of the melting/gasifying furnace for their extraction.

The (first) melting/gasifying furnace for the realization of the first process of the present invention aiming to produce molten pig iron and gasify fuel comprises a furnace main, a top inlet for the introduction of reduced iron, coke and auxiliary materials and a gas outlet, which are provided in the top portion of said furnace main, outlets for the discharge of molten pig iron and slag provided in the bottom portion of said furnace main, a coke-filled layer provided in a major portion of said furnace main, said layer including therein voids through which a gas flows in countercurrent contact with molten iron and slag, and said layer bearing an unmolten stock charged through said inlet on the top thereof, a tuyere or tuyeres for blowing oxygen, fuel comprising mainly, carbon and hydrogen and, if required, slag forming material and/or steam, said tuyere(s) being provided in the side wall portion corresponding to the lower region of said coke-filled layer, and a combustion zone or zones provided in front of said tuyere(s), a melting section borne on said coke-filled layer and comprising a stock of reduced iron, coke and auxiliary materials charged through said top inlet, and a hearth formed in the lowermost region of said furnace main.

The inventive second process is a modification of the inventive first process, wherein the gasification of fuel is effected substantially outside of the outer periphery of the lower region of the coke-filled layer.

The furnace desinged to carry out the inventive second process includes middle opening(s) provided in the side wall above the tuyere(s), through which are introduced solid fuel and, if required, slag-forming material etc., and combustion zone(s) formed of a charge of solid fuel and provided substantially outside of the outer periphery of the lower region of the coke-filled layer.

The inventive third and forth processes (for the gasification of fuel) are basically analogous to the first and second gasification processes, respectively, wherein the ashes originating from fuel are melted, slagged and flowed down together with, i.e., with the aid of, molten iron, and the resulting molten iron and slag are collected in the lowermost region of the furnace for their extraction. These modified processes are best suited for use in the gasification of solid fuel such as coal, coke, etc. and realized by employing the first or second melting/gasifying furnace. The resulting reducing gas is a hot gas mainly comprising carbon monoxide and hydrogen, which is useful as a fuel, reducing or feed gas as a raw material.

The inventive fifth or sixth system process employs a combination of the first or second melting/gasifying furnace with a shaft reduction furnace (first or second system) to introduce the reducing gas recovered from the melting/gasifying furnace into the shaft reduction furnace wherein iron ores are reduced into reduced iron, and to admit the reduced iron into the melting-/gasifying furnace wherein it is converted into molten pig iron. The shaft reduction furnace may be of either moving—or staticbed type.

With the fifth and sixth system processes, it is possible to make molten iron with an amount of energy that is analogous to or less than that required in the blast furnace process and with the use of a feed of raw materials of quality and/or grade that are lower than those of materials demanded in the blast furnaces process, as well as with an reduced coke ratio in comparison to that process.

The present invention will now be explained with reference to the embodiments illurstrated in the accompanying drawings for the purpose of illustration only; the present invention is not limited thereto whatsoever.

DETAILED DESCRIPTION OF THE PREFERRED EMBODIMENTS

First Melting/Gasifying Furnace and Process

A coke-filled layer bears an amount of reduced iron on the top thereof, the reduced iron being melted by an ascending hot gas, and is useful for making effective use of the sensible heat of the hot gas. This coke-filled layer serves to maintain the reduced iron at a high level and to produce satisfactory molten iron, when both the molten iron formed by melting of reduced iron and the iron oxide-containing slag flow down through the coke filled-layer in the countercurrent relation to the ascending hot gas for the reduction of iron oxides and the carburizing of molten iron.

In accordance with the present invention, the fuel composed mainly of carbon and hydrogen is gasified into a combustion gas composed mainly or, preferably, substantially consisting of CO and $H_2$ by oxygen and, optionally steam, for the following primary reasons.

1. The gas formed is a high-calorie, hot and reducing gas composed mainly of CO and $H_2$. The use of air is unpreferable since the resulting gas assumes a high $N_2$ content (%).

Recovering and further utilization of this hot reducing gas makes great contribution to improvements in the overall energy efficiency.

2. If use is made of oxygen, it is then possible to obtain a gas having a high temperature sufficient to melt reduced iron by blowing it into the furnace at normal temperature. However, the use of air requires pre-heating at about 500° C. or higher.

3. Steam is used at need to control the temperature of the gas generated, and ascribable to an increase in the hydrogen content of the gas generated, when a carbon-rich fuel such as coal or coke is used.

The term "fuel(s)" refers to solid fuel such as coal or coke, liquid fuel such as heavy oil or tar and gaseous fuel such as natural gas, coke oven gas or the like. As the fuel, coal, coke (particularly pulverized coal, coke breeze) etc., i.e., solid fuel may be employed advantageously.

When the fuel used is coal, the hot gas formed in the combustion zones and composed mainly of carbon monoxide and hydrogen has the following composition: CO: 60–75%, $H_2$: 25–35% and $CO_2$ plus $N_2$: about 5%.

It is here noted that the hot gas composition may fluctuate more or less depending upon the amounts of fuel and steam blown in, etc. The maximum temperatures in the combustion zones are of the order of 2000° to 2500° C., usually about 2300° C. In this case, the gas recovered after melting of reduced iron has a CO content somewhat larger than that of the aforesaid hot gas (as generated in the combustion zones), and assumes a composition of, e.g., CO: 65–80%, $CO_2$ plus $N_2$: 5% and $H_2$: 20–30%. The gas recovered should also have a temperature ranging normally from 900° to 1000° C., preferably about 950° C., depending upon the charge temperature, the operating conditions and other factors. This high-calorie hot gas recovered is advantageously used as a reducing, fuel or chemical material gas or the like gas in the successive processes.

Usually, the molten iron formed flows down thorugh the coke-filled layer (functioning as a heating section) at 1500° to 1600° C., and generally assumes a resultant composition of C: 4.5%, Si: 0.2% Mn: 0.2%, P: 0.12% and S: 0.03% (in the case of using pulverized coal as the fuel and semi-reduced iron as a stock). During it flows down through the coke-filled layer, the molten iron is desulfurized by the slag whose basicity is adjusted to a suitable degree (about 1.0 to 1.5), and is finally collected in a hearth formed in the lowermost region of the furnace main, which may include the bottom region of the coke-filled layer.

The stock charged is reduced iron, and an additional amount of coke is replenished to make up for a coke loss of the coke-filled layer, while a given amount of a slag-forming material (flux) such as limestone which is counted as 'auxiliary materials' hereinafter is added for the adjustment of the fluidity and basicity of slag. The auxiliary materials further encompasses other known additives which are employed in making pig iron.

The reduced iron which can be advantageously used with the inventive melting/gasifying furnace is one having a metallization (M.Fe/T.Fe) of about 75% or higher, and may be a mixture of reduced iron with ores.

The oxygen used is preferably pure oxygen (purity: 99% or higher), but industrial oxygen having an oxygen content of 96 to 97% or even about 90% or higher may be employed on account of economical and other considerations.

The voids or intersticial spaces in the coke-filled layer may be of such a nature that the ascending hot gas comes in countercurrent contact with a down-flow of the molten iron formed by melting of reduced iron and the iron oxide-containing slag. The coke used may be of a diameter of 30 mm or more, which is variable in dependence on the size of the furnace applied, the operating conditions and other factors. The height of the coke-filled layer is determined taking into consideration the carburizing of molten iron, i.e., dissolving carbon of the coke in the molten iron, the reduction of the oxides in the slag and other factors, and may be about 4 to 5 m, as measured from the puyeres level, in the case of a furnace with a daily production capacity of 2000 tons.

The coke-filled layer has a strength sufficient to maintain the stock of reduced iron, coke and auxiliary materials such as lime etc. on the top thereof, and occupies a main portion in the furnace. It is understood that use may be made of semi-coke.

A suitable number of combustion zone or zones for the gasification of fuel is are provided in front of the tuyere(s) preferably formed radially in the furnace side wall corresponding to the lower region of the coke-filled layer. The temperatures in the combustion zones are controlled to given values by an amount of steam injected through the tuyeres.

The coke-filled layer may usually be of a circle or polygon in its holizontal cross-section depending upon the cross-section of the furnace. The tuyere is open outward of each combustion zone, through which are blown fuel and oxygen and, if required, steam, as well as, if desired, slag-forming material such as powdered limestone.

The coke-filled layer carries a load from its upper region at the center of its lower region, and has therein voids of a size suitable for permitting both the gas and the slag to flow therethrough. In the lowest region of the furnace, there is a hearth for the collection of molten iron and slag.

The coke-filled layer forms the walls of the combustion zones, and is consumed along with the combustion and gasification of fuel. Hence, an additional amount of coke is generally replenished through the top inlet together with an amount of fresh reduced iron.

If required, a slag-forming material such as limestone is supplied thorugh the top inlet to adjust the basicity, flowability, desulfurizing effect, etc. of the slag.

The coke-filled layer usually assumes a temperature of about 1800°–2000° C. in the lower region and a temperature of about 1600°–1650° C. in the upper region. The reduced iron and the coke are alternately or in admixture charged through the furnace top to form a reduced iron layer (or a mixture of it with coke) on the top of the coke-filled layer, and is then melted gradually by the ascending hot gas. The reduced iron selected may be of a grain size of 5 mm or more so as to ensure good permeability and prevent its take away by the gas flow.

When employing the basic arrangement as mentioned above, the basic parameters applied in the inventive first process are for instance given in Examples 1 and 2 (pure oxygen, pulverized coal as fuel, and semi-reduced iron as stock).

In operation, the pressure in the furnace may be on a low level of, e.g., 1 Kg/cm$^2$ or more, provided that the pressure for further use of the recovered gas is neglected, but may vary between 3 and 5 Kg/cm$^2$ for usual purposes.

According to the present invention, it is thus possible to gasify fuel composed mainly of carbon and hydrogen, such as coal or heavy oil, by means of oxygen and, if required, steam, to melt reduced iron on top of the coke-filled layer into molten iron, and to recover a hot gas composed mainly of carbon monoxide and hydrogen. The present invention is effective not only for melting of reduced iron, etc., but also for employing fuel such as coal by means of direct combustion and gasification thereof as well as the gas recovered is advantageously used for other purposes of concern.

The present invention is distinguished over the prior art blast furnace process in that a larger amount of fuel such as pulverized coal, tar or heavy oil is gasified by pure oxygen for melting reduced iron.

Other advantages of the present invention are:

1. About 60% or more of the total input fuel can be fuel other than coke.

2. Larger amounts of pulverized coal and other fuel can be blown through the tuyeres.

3. There is no deterioration in the reaction of coke since melting of (semi) reduced iron is aimed at. This makes the use of low-strength coke possible.

4. Use may be also made of semi-coke. Therein, a semi-coke product leaving the step of the production of reduced iron, which is still mixed therewith, may be used as such.

5. The furnace used is of simple construction, and decreased in size.

6. The sulfur content in molten iron can be maintained to 0.03% or less by controlling the composition of slag by the addition of a slag-forming material such as limestone, etc.

7. The thermal efficiency of this process is enhanced since countercurrent heat exchange between the hot combustion gas and the molten iron and slag takes place with the aid of, i.e., through the coke-filled layer.

8. The practical investigations revealed that the resultant CO$_2$ amounts 1–2% in the recovered gas (pulverized coal blown through tuyeres, O$_2$: pulverized coal ratio = 1 Nm$^3$: 1 kg)

The present invention will now be elucidated with reference to the following examples. In the following examples the embodiments of the present invention will be shown as designed furnaces or systems, or calculated, operation data for practical use, which were scalled up based on the test results.

EXAMPLE 1

Figure 1:
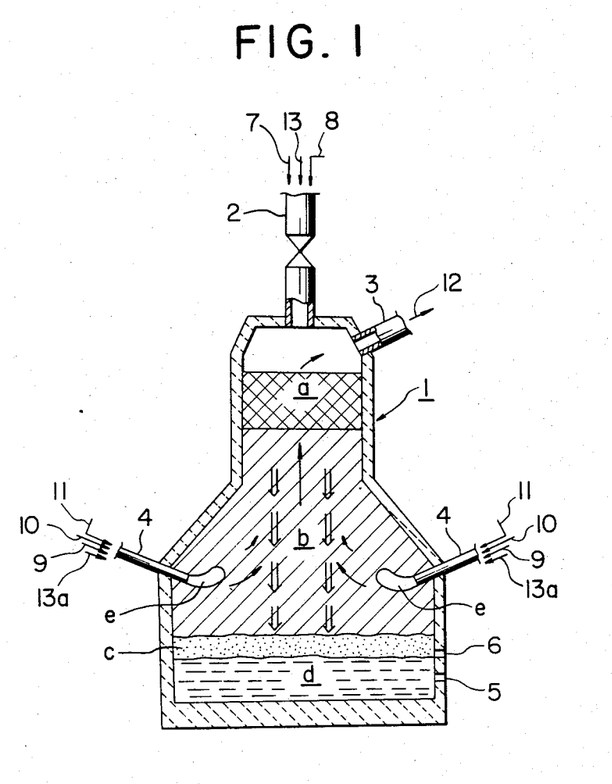
FIG. 1 is a longitudinal section of one embodiment of the melting/gasifying furnace used in the present invention.

Referring to FIG. 1, a furnace shown generally at 1 has an inlet 2 for the introduction of semi-reduced iron and coke and a gas outlet 3 in the top portion, a plurality of tuyeres 4 for the injection of oxygen and steam as well as pulverized coal and, if required, powdered limestone in the side wall, and molten iron and slag outlets 5, 6 in the bottom portion. The furnace 1 is a substantially cylindrical furnace whose lower part is of a somewhat larger diameter, and is provided with the inlet 2 and the gas outlet 3 in the top portion. The tuyeres 4 are provided in the side wall of the upper part in the furnace portion of a larger diameter, and the molten iron outlet (tapping hole) 5 and slag outlet (cinder notch) 6 (from above) are provided in the furnace side wall below the level of tuyeres 4.

An amount of coke is charged into the furnace 1 through the top inlet 2. The furnace 1 is previously loaded with a coke-filled layer b retaining therein voids. On the layer b is placed a layer a in which an amount of reduced iron is charged in unmolten state, and below the layer b are positioned a molten slag layer c and a molten iron layer d. A plurality of combustion zones e are formed in front of the tuyeres 4, in the lower region of the coke-filled layer.

This furnace is typically of the following dimensions.
Inner Diameter of Tuyeres: 190 mm
Number of Combustion Zones in front of Tuyeres : 4
Upper Section Inner Diameter of the Coke-Filled Layer : 4 m
Lower Section Inner Diameter of the Coke-Filled Layer : 6 m
Distance Between Reduced Iron-Charged Layer and Tuyere Level : 5 m Oxygen 9 and fine coal 10 are blown into the furnace 1 through the tuyeres 4, and reduced iron 7 and coke 8 (having a particle size of 40 mm or more) are charged together with limestone 13 through the top inlet 2. The furnace is operated at an internal pressure (within the combustion zones) of 5 Kg/cm$^2$. The generated gas 12 is recovered through the gas outlet 3, and the molten iron of 1500° C. is discharged through the outlet 5 provided in the hearth. The slag is occasionally discharged through the outlet 6. The operation data showing amounts of the materials and fuel to be used and the products obtainable are summarized in Table 1.

The reduced iron 7 has a particle size of 5–15 mm and a metallization (M.Fe/T.Fe) of 90%, the oxygen used a purity of 99%, the coke used a fixed carbon content of 88.9% and an ash content of 10.6%, and the pulverized coal used a carbon content of 52.1%, a volatile content of 30%, an ash content of 15.0% and a moisture content of 2.2%. The composition of the reduced ion is shown in Table 2.

TABLE 1

OPERATION DATA
(Per 1 ton of Fe in molten iron)

| | | |
|---|---|---|
| Oxygen | 373.2 Nm$^3$ | |
| Pulverized coal | 456.1 Kg | Blown through tuyeres 4 |
| Powdered limestone | 108.9 Kg | |
| Reduced iron | 1288.8 Kg | Charged through top inlet 2 |
| Coke | 241.2 Kg | |
| Gas recovered | 1209.7 Nm$^3$ | Recovered through gas outlet 3 |
| CO | 75.4% | |
| CO$_2$ | 1.9% | |
| H$_2$ | 22.3% | |
| N$_2$ | 0.4% | |
| Temperature | 950° C. | |
| Calorie | 2850 KCal/Nm$^3$ | |
| Molten pig iron | 1048 Kg | Discharged through outlet 5 |
| C | 4% | |
| Si | 0.2% | |
| Mn | 0.2% | |
| P | 0.12% | |
| S | 0.03% | |
| Slag | 408.8 Kg | Basicity: 1.2 |

TABLE 2

| Composition | T.Fe | Feo | M.Fe | SiO$_2$ | CaO |
|---|---|---|---|---|---|
| % | 77.6 | 10 | 69.8 | 7.06 | 6.89 |

EXAMPLE 2

The furnace similar to the furnace 1 of Example 1 is operated mainly with reduced iron (M.Fe/T.Fe : 85%) and semi-coke (81.5% fixed carbon, 8% volatile content and 10.5% ash). Additionaly steam is blown through the tuyeres. The results are given in Table 3.

TABLE 3

| | | | | |
|---|---|---|---|---|
| Oxygen | 328 Nm$^3$/t · Fe | Molten iron formed | | 1050 Kg |
| Pulverized Coal | 393.5 Kg/t · Fe | C | 4.5% | |
| Steam | 7.2 Kg/t · Fe | Si | 0.2% | |
| | | Mn | 0.2% | |
| Reduced iron | 1349 Kg/t · Fe | P | 0.12% | |
| Semi-Coke | 205 Kg/t · Fe | S | 0.03% | |
| | | Temp. | 1500° C. | |
| Gas recovered | 1082 Nm$^3$/t · Fe | Amount of slag | | 387 Kg |
| CO | 67.6% | Semi-reduced iron | | |
| CO$_2$ | 2.0% | T.Fe | 74.15% | |
| H$_2$ | 30.0% | M.Fe | 63.03% | |
| N$_2$ | 0.4% | FeO | 14.3% | |
| Temperature | 950° C. | SiO$_2$ | 6.8% | |
| Calorie | 2813 Kcal/Nm$^3$ | CaO | 10.2% | |

SECOND MELTING/GASIFYING FURNACE AND PROCESS

The second process of the present invention is a modification of the first process, wherein the gasification of fuel is effected in combustion zone or zones located substantially outside of the lower region of the coke-filled layer. The furnace designed for the realization of the second process includes middle opening or openings, provided in the furnace wall above the tuyere(s), for the introduction of solid fuel and, if required, slag-forming material etc., and a combustion zone or zones formed in a layer of the solid fuel charged through the middle openings (referred to "solid fuel charge" hereinafter) located substantially outside of the lower region of the coke-filled layer.

Figure 2:
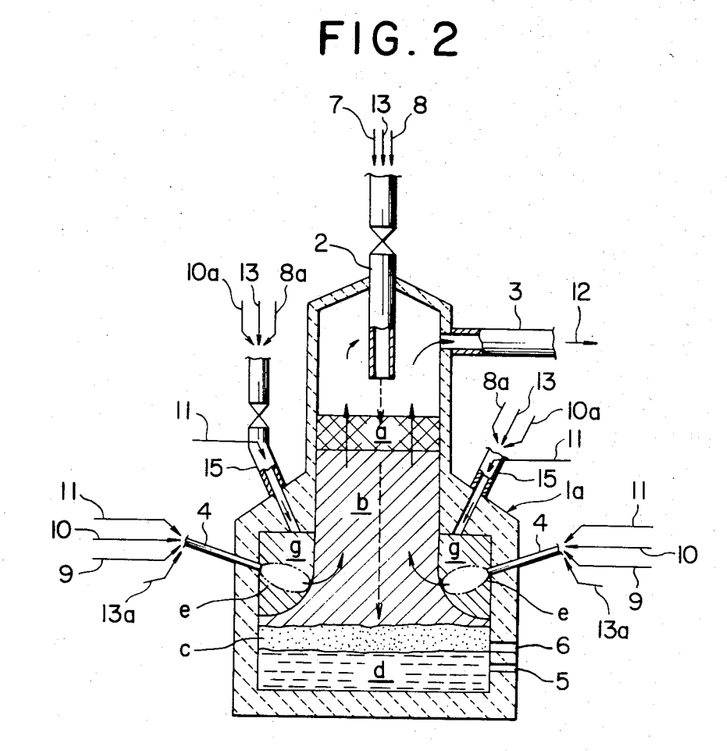
FIG. 2 is a longitudinal section of another embodiment of the melting/gasifying furnace.

FIG. 2 is a schematical view of the second melting-/gasifying furnace shown generally at 1a, which is a modification of the first furnace of FIG. 1. As outlined as above, the furnace 1a includes a plurality of middle openings 15, formed above tuyeres 4, for the introduction of solid fuel such as coke or coal, slag-forming materials such as limestone, and the like. In front of the tuyeres 4, there are a plurality of combustion zones e formed of the solid fuel charge supplied through the openings 15. The coke (i.e., fuel coke) supplied through the opening 15 may of the grade available for fuel.

As the solid fuel, only coal may be charged through the openings 15. However, care should be taken of avoiding hanging of the solid fuel charge, i.e. a coal-filled layer g due to its overheating by blowing steam 11 through the openings 15 or into the vicinity thereof, if necessary.

Like the first furnace, powdered fuel such as pulverized coal or coke breeze, or other liquid or gaseous fuel may be blown thorugh the tuyeres 4 at need (however, preferred). Particular preference is given to blowing-in of pulverized or fine coal. In the case of injecting pulverized coal, coke breeze, etc. through the tuyeres 4, a slag-forming material 13a such as limestone in the powder form is simultaneously blown into promote rapid formation of slag, improve the fluidity thereof, and facilitate discharging thereof from the combustion zones e.

The second process (furnace) provides additional advantages that the solid fuel such as coal, coke and the like is used in an amount greater than that used in the first process for gasification; the coke consumption of the lower region of the coke-filled layer is reduced due to the fact that the combusion zones are formed of (and surrounded with) the layers g filled with the solid fuel supplied through the middle openings 15; etc.

The above-mentioned combustion zones are formed as follows.

In case where, in order to decrease the consumption of coke made of coking coal, pulverized coal is burned by blowing-in pulverized coal together with oxygen and steam through the tuyeres, the combustion gas assumes extremely high $CO_2$ and $H_2O$ contents if the combustion zones are not filled with coke or coal resulting in consuming coke in the coke-filled layer by reacting therewith. In case where the combustion zones are densely filled with coke or coal, on the contrary, $CO_2$ and $H_2O$ gas in the combustion gas are converted into CO and $H_2$ gas by reacting with coke or coal in the combustion zone thus attaining a high calorific value; however, the generating combustion gas flow encounters resistance or obstacle in the combustion zones, and disturb the race ways to be formed in the frontal region of the noses of the tuyeres to such an extent that no stable combustion is assured. These problems are overcome in the second process in which the combustion zones are formed of or filled with coke of coal (solid fuel) to obtain a high-calorie combustion gas, and a frontal and lower race ways of the combustion zone(s) are formed of the coke-filled layer which is filled with coke (charged through the top inlet having a grain size larger than that of coke in the combustion zones is formed to stabilize combustion and proceed the reaction of $CO_2$ generated in the comustion gas in said zones with coke to form a gas rich in CO and having an extremely low $CO_2$ content.

The coke-filled layer b should always be kept constant by replenishing a given amount of coke through the top inlet 2.

The ashes originating from the solid fuel such as coke, coal and the like in the combustion zones are slagged in a stabilized manner by an amount of the slag-forming material 13 such as limestone or quick lime fed from above the combustion zones, and flow down towards the furnace bottom through the combustion zones. The feed ratio of limestone may be adjusted, e.g., up to about 1.5 by optionally regulating the ratio of CaO formed by thermal decomposition of limestone to $SiO_2$ being a main component of the ashes resulting from coke, coal and the like.

The combustion gas ascends through the coke-filled layer having a grain size of 50 mm or less, and melt the reduced iron on the top thereof. At the same time, the formed slag flows down through the coke-filled layer to the furnace bottom. To this end, a hearth d is formed on the furnace bottom, which is divided into an upper portion for receiving the slags c resulting from the reduced iron and the ashes coming from the combustion zones and a lower portion for receiving the molten pig iron.

FIG. 2 is a schmatical view of the furnace 1a (the second furnace) for the realization of the second process. The second furnace 1a is a furnace of the shaft type comprising a furnace main, a plurality of tuyeres 4 for blowing-in of oxygen, steam and pulverized coal in the side wall, a plurality of middle openings 15 provided in the side wall above the tuyeres for the introduction of solid fuel such as coke, coal, limestone, etc., top inlet 2 for charging stock comprising reduced iron 7, coke 8 and the like and a gas outlet 3 in the top portion, and a molten iron outlet 5 and a slag outlet 6 in the bottom portion. In front of the tuyeres 4 there are a plurality of combustion zones e formed of layers g filled with coke, coal, limestone and the like supplied through the middle openings 15, into which combustion zones the pulverized coal blown through the tuyeres is burned together with the filled coke and coal by oxygen and steam that are, at the same time, introduced through the tuyeres 4. In front of the combustion zones there is a heating section comprising part of the coke-filled layer b filled with coke charged through the top inlet 2. Above the heating section there is a melting section formed of the layer filled with reduced iron charged through the top inlet 2. A hearth d is formed for receiving the molten pig iron and slag flowing down from the heating section and the molten ashes formed in the combustion zones.

It is noted that the pressure of gas in the above-mentioned furnace is adjustable by a pressure regulating valve provided on a gas recovery line extending from the outlet 3.

According to the inventive second process, the reducing hot gas having an extremely low $CO_2$ content can be genelated and recovered, and the molten iron can be converted into pig iron having a low sulfur content by using the arrangement including the zones for combustion of coke, coal, limestone and pulverized coal and the heating section formed of the coke-filled layer, viz., the section in which the gas come into countercurrent contact with the melt, provided in front of the combustion zones. In addition, the gasification of coal and the melting of reduced iron can continuously be carried out over an extended period due to the use of the moving bed whose contents are subjected to renewal or replenishing momentarily.

The second furnace may be operated in the following different operational conditions:

OPERATION I.

Operation for the conversion of reduced iron supplied through the top inlet into powdered reduced iron:

Although this operation is subject to variation depending upon a rate at which a gas flows through the melting section, there is no possibility that, at a gas flow rate of 1 m/S, even granular reduced iron having a grain size of 10 mm or less may be entrained in the gas and leave the gas outlet. On the contrary, such reduced iron is melted more rapidly than pelleted reduced iron due to its small grain size. The inventive furnace is therefore expected to be sufficiently applicable to this operation. When reduced iron having a smaller grain size is used, satisfactory results are obtained if the amount of gas to be generated is decreased by decreasing the amount of oxygen blown through the tuyeres, or if the flow rate of gas passing through the melting section is decreased by maintaining the pressure in the furnace at 5 kg/cm$^2$ or higher.

OPERATION II.

The inventive furnace can be operated with no supply of coke and coal through the middle openings, viz., in a condition where the combustion zones are not filled. With this embodiment, it is possible to burn pulverized coal supplied through the tuyeres in a stabilized manner by the aid of the heat radiating from the lower region of the coke-filled layer of the heating section located in the frontal region of the combustion zones.

In the embodiment, however, the pulverized coal should be used as much as possible, since the coke forming part of the heating section is consumed by the $CO_2$ gas generated in the combustion zones. An increase in the amount of pulverized coal results in a considerable lowering in the amount of such coke to be consumed up to a half thereof. This is because only feeding of coke into the heating section suffices for the desired results.

OPERATION III.

The inventive furnace is applicable to the embodiment wherein limistone is blown through the tuyeres. According to this operation, powdered limiestone or quick lime is supplied by blowing them through the tuyeres 4 in place of feeding limestone etc. thorugh the middle openings or to make up the amount of lime supplied through the middle openings. The powdered lime is rapidly melted, and mixed with molten ashes originating from pulverized coal, etc., to improve the fluidity of the molten ashes. This results in that the amount of lime to be used can be decreased by about 10-20% in comparison with the case where the lime is supplied through the middle openings.

OPERATION IV.

The inventive furnace is applicable to an embodiment wherein liquid fuel such as heavy oil, gaseous fuel such as natural gas or powder fuel such as powdered asphalt pitch is emplayed as fuel. Such fuels can be employed substituting for pulverized coal or as a mixture therewith.

In the case of using heavy oil as fuel, it is required to decrease the amount of steam blown through the tuyeres, since it absorbs more decomposition heat than pulverized coal does. However, the amount of heavy oil used is less than that of pulverized coal, since it contains larger amounts of carbon and hydrogen. The natural gas or asphalt pitch may be used, if the amount of steam used supplied through the tuyeres is regulated so as to maintain the gas generated in the combustion zones at a suitable temperature above 1800° C.

The second process according to the present invention will now be explained with reference to Example 3.

EXAMPLE 3

Using the furnace arrangement of FIG. 2, the coal is gasified, and the reduced iron is melted into pig iron with the following operation data. Table 4 shows the composition of the pulverized coal, coke and reduced iron applied, and Table 5 the composition, amount, temperature, etc., of the resultant molten pig iron and the recovered gases.

OPERATION DATA

1. FURNACE ARRANGEMENT
   Number of Combustion Zones (Tuyeres) : 4
   Effective Height (from the bottom to the gas outlet) : 10 m
   Diameter of Melting Section : 5 m
   Effective Volume of Furnace : 350 m³
2. FEED OF MATERIALS AND FUELS
   Oxygen : 28 KNm/hr
   Steam : 1 ton/hr
   Pulverized Coal : 28 ton/hr
   Coke (charged through middle openings 15) : 10 ton/hr
   Coke (charged through top inlet) : 8 ton/hr
   Coal (charged through middle openings 15) : 3 ton/hr
   Limestone : 7 ton/hr
   Reduced Iron : 110 ton/hr
   Pressure in Furnace : 5 kg/cm²

TABLE 4

| | |
|---|---|
| Pulverized Coal | C: 75%, $H_2$: 5% through 200 mesh sieve: 70% |
| Coke (charged through middle openings 15) | C: 88%, Grain Size: 15 mm |
| Coke (charged through top inlet) | C: 88%, Grain Size: 50 mm |
| Reduced Iron | Metallization: 85%, $CaO/SiO_2$: 1.3 Grain Size: 10 mm |

TABLE 5

| | |
|---|---|
| Molten Pig Iron | C: 4.5%, Si: 0.5%, S: $\leq$ 0.02% Temperature: 1500° C. |
| Recovered Gas | CO: 76%, $H_2$: 22%, S: 200 $\leq$ ppm Temperature: about 1000° C., Calorie: about 2950 Kcal/Nm³, Dust Content: $\leq$ 10 gr/Nm³ |

According to the present invention, the high quality pig iron for steel making is obtained having carbon, silicon and sulfur contents of 4.5%, 0.5% and 0.02% or less, respectively, and the high quality gas is recovered having a calorie of about 2950 Kcal/Nm³, a dust content of 10 gr/Nm³ or less and a sulfur content of 200 ppm or less, as will be appreciated from the results of Table 5.

GASIFICATION PROCESS OF FUEL BY MELTING/GASIFYING FURNACE

THIRD AND FOURTH PROCESSES

The first and second processes (furnaces) are designed to effect the gasification of fuel and the recovery of the resulting gas concurrently or simultaneously with the melting of reduced iron and the production of molten iron. However, the inventive furnaces can also be used mainly for the gasification of fuel.

Figure 5:
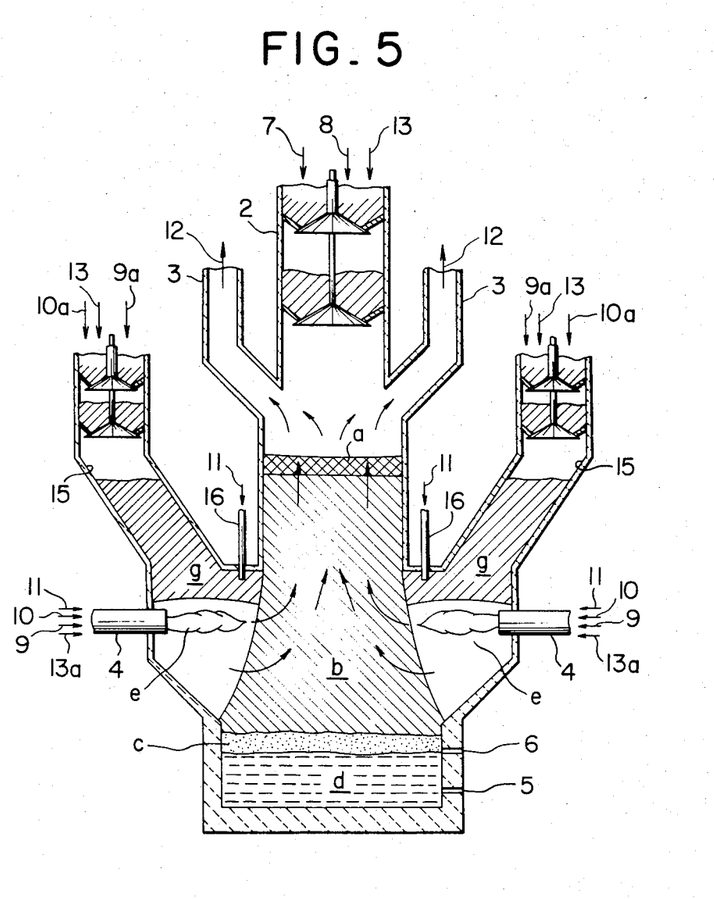
FIG. 5 is a view showing yet another embodiment of the melting/gasifying furnace.

FIG. 5 shows one embodiment of the furnaces designed to this end.

The illustrated furnace is basically similar to the second furnace in that it has a plurality of tuyeres 4, a plurality of openings 15 positioned above the tuyeres 4, and a plurality of combustion zones e located substantially outside of the lower region of a coke-filled layer b and in front of the tuyeres 4, and formed of layers g filled with the solid fuel charges from the middle openings 15. The gas obtained is again a reducing hot gas composed mainly of carbon monoxide and hydrogen. To permit effective gasification of fuel such as coal, it is required to remove molten ashes which could not easily be discharged from the furnace in the prior art. According to the present invention, the molten ashes are entrained in or carried out by a down flow of molten reduced iron, and discharged from the furnace as slag together with molten iron.

The combustion zones e are formed by injection of $O_2$ or steam through the tuyeres 4. Given amounts of coke, coal and limestone are introduced through the middle openings 15 into the zones e wherein they are burned. The resulting hot gas passes upwardly through the coke-filled layer b filled with low-reactivity coke to melt reduced iron by the sensible heat thereof. The thus generated reducing hot combustion gas composed mainly of carbon monoxide and hydrogen is recovered from the gas outlet 3. On the other hand, the molten ashes formed in the zones e, the melt comprising CaO, a main component of limestone, and the reduced iron melted on the top of the coke-filled layer b flow down through the layer b into the hearth d, and discharged through the outlets 5 and 6.

The problems as encountered in the prior art concerning the gasification of coke or coal by $O_2$ or air have been eliminated by the present invention designed to fill the combustion zones e with the coke- or coal-charged layers g to obtain a high-calorie gas, and to form the layer b filled with high-permeable but low-reactive coke in the frontal region of the zones e to attain stable combustion, whereby the combustion gas passes through the zones e straight. When the gasification of fuel is primarily aimed at, graphite balls may be filled in the layer b in place of coke.

With the static bed gasification system according to the present invention, it is possible to obtain a high-calorie gas having a temperature of as high as 2000° C. by stable combustion of non-coking coal or low-strength coke obtained by semi-coking of non-coking coal hardened by a bonding agent. In addition, by the sensible heat of the generated hot gas reduced iron can be converted into molten iron, which entrains therein the ashes resulting from coke and non-coking coal, and is discharged as such in a stable manner. It is noted that the term "static bed" does not exclude the replenishment of coke to the coke-filled layer as mentioned hereinbefore.

According to the present invention, it is also possible to control the temperature of the combustion gas in the combustion zones filled with coke or coal to a suitable value either by regulating the flow rate of steam to be injected through the tuyeres 14 or by blowing steam through a separately arranged nozzle 16. When there is a rise in the $CO_2$ concentration in the combustion gas recovered, it is possible to regulate the amounts of oxygen, air of a normal temperature and pulverized coal to be blown through the tuyeres 4.

The present embodiment will now be elucidated with reference to the following example.

EXAMPLE 4

Figure 6:
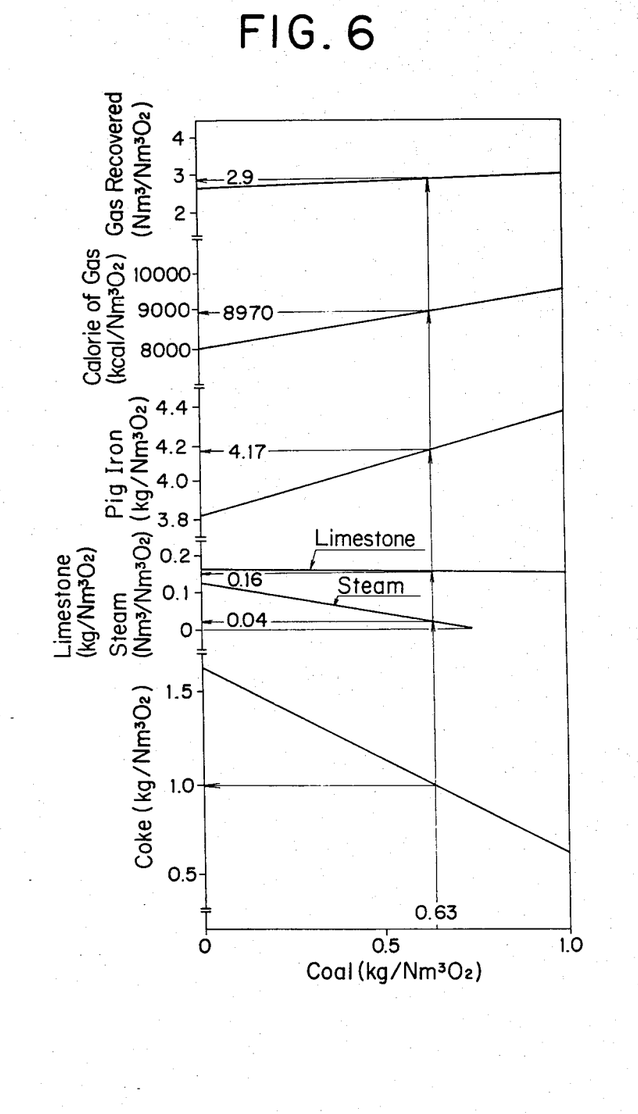
FIG. 6 is a graphical view showing the relationships between various parameters including the amounts coke, lime, pig iron produced, gas generated and combustion gas per $Nm^3$ of $O_2$, which vary in relation to the amount of coal to be supplied.

With the melting/gasifying furnace of FIG. 5, the coal is gasified, and the reduced iron is melted into pig iron. FIG. 6 shows the amount of combustion gas recovered, pig iron produced, limestone charged, steam blown and coke used per a charge of coal and the calorific value of the combustion gas.

From FIG. 6, it has been found that the more the amount of coal, the higher is the calorific value of the obtained gas corresponding to a difference in the resultant gas volume between coal and coke, and the higher is the melting power of the gas.

SYSTEM PROCESS FOR MAKING PIG IRON USING A COMBINATION OF MELTING/GASIFYING FURNACE WITH A SHAFT REDUCTION FURNACE

Fifth and Sixth Processes

Reference will now be made to the process for making pig iron using a combination of the foregoing melting/gasifying furnace with shaft reduction furnace.

In what follows, the term "iron ores" shall include lump ores and agglomerated ores such as iron oxides in granular or lump form, e.g. pellets or brickets or the like unless otherwise specified.

As already mentioned, any iron melting processes in the prior art except for those resorting to the blast furnace leave much to be desired as such, and have the disadvantage that the gas recovered from the melting furnace is unsuitable in view of efficient reduction of iron ores.

A typical example of the prior art gas reduction furnaces for iron ores is a shaft reduction furnace. The shaft furnace requires the production system of a reducing gas which is specially designed to this end. To put it in another way, special fuel such as natural gas reformed by steam (e.g., manufactured by Foster Wheeler Co., Ltd.) should be used in this furnace.

The fifth and sixth processes according to the present invention are accomplished with a view to decreasing the consumption of energy and the coke ratio as compared with the blast furnace process and using a feed of low quality and/or grade. According to the present processes, this object is achieved by the provision of a process for pig iron making using a combination of a gas reduction furnace with the melting/gasifying furnace for the melting of reduced iron and the generation of a reducing gas.

As the shaft reduction furnace, use may be made of either the moving bed type or the static bed type, but preference is given to the moving bed type furnace. However, a plurality of the static bed type furnaces may be alternately operated for continuous operation. The present processes will now be explained with reference to the shaft reduction furnace of the moving bed type.

The moving bed type reduction furnace includes a furnace main having an iron ore inlet and a gas outlet in the top portion, a gas injection opening in the side wall and a reduced iron outlet in the bottom portion. Within the furnace main, there is a layer filled with granular iron oxides supplied through the iron ore inlet. The reducing gas blown through the gas inlet flows upwardly through the iron oxide-filled layer and reduces the glanular iron oxides, resulting in granular reduced iron. The reducing gas is recovered through the gas outlet, while the resultant reduced iron is discharged through the bottom outlet.

In the combination system of the shaft reduction furnace of the moving bed type and the melting/gasifying furnace, the gas formed in the latter furnace is used as a reducing gas in the shaft reduction furnace and recovered, whilst the reduced iron formed in the shaft reduction furnace is melted in the melting/gasifying furnace. In this way, the overall energy consumption is decreased or limited, while a feed of low quality or grade can be used.

More specifically, this inventive process for the production of pig iron comprises reducing iron ores in the shaft reduction furnace with a reducing gas recovered from the melting/gasifying furnace, and melting the thus reduced iron into pig iron in the melting/gasifying furnace. In the melting/gasifying furnace, the fuel composed mainly of carbon and hydrogen is burned and gasified by oxygen to generate a reducing hot gas composed mainly of carbon monoxide and hydrogen. The hot gas is allowed to flow upwardly through the coke-filled layer, thereby melting the reduced iron on the top thereof. The molten iron flows downwardly through the coke-filled layer, and is converted into pig iron. The reducing gas is recovered through the top outlet, and supplied into the reduction furnace. It is understood that an extra amount of the reducing gas is discharged to the outside of the system, and used for other purposes.

The iron reduced in this shaft furnace assumes a metallization (M.Fe/T.Fe) of about 75% or higher that is useful for feeding to the melting/gasifying furnace. If required, a mixture of reduced iron with fresh iron ores may be fed in the melting/gasifying furnace, taking into account the balance between the metallization of the feed and the capacity of the reduction furnace.

The shaft reduction furnace may be of the type capable of effecting high-pressure reduction. This is because the desired high-pressure reducing gas can be recovered by the adjustment of the pressure in the melting/gasifying furnace. The shaft reduction furnace is preferably of the moving bed (or continuous) type, but the reduction furnace of the static bed type may be applied, if required. The moving bed type reduction furnace suitable for use in the present invention is, for example, Midrex process, Armco process, Purofer process or Nippon Steel process type furnace.

Figure 3:
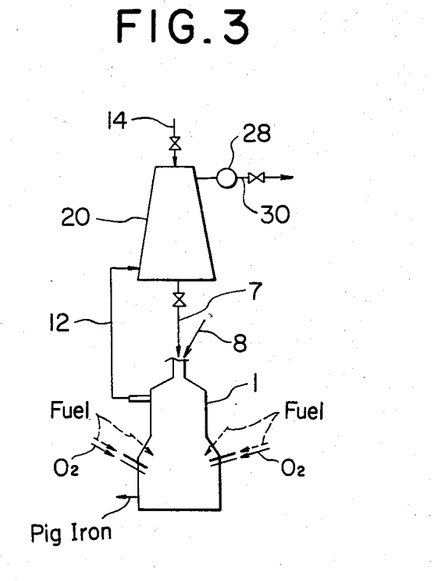
FIG. 3 is a flow chart illustrative of the system for the production of pig iron comprising a combination of the melting/gasifying furnace with shaft reduction furnace.

As shown in the flow chart of FIG. 3 that is illustrative of the principal arrangement of the present invention, an amount of iron 7 reduced in a shaft reduction furnace 20 is fed into a melting/gasifying furnace 1, after cooled at need. In reduction, the shaft furnace is operated at an internal temperature of 800°–950° C., preferably 900° C., and at an internal pressure of 2.0–2.5 atm on the condition that a preferably high-pressure reduction system is applied. If required, an amount of fresh iron ores 14 is preheated. Either one of the first and second melting/gasifying furnaces is equally applied, (the fifth and sixth process, respectively).

Figure 4:
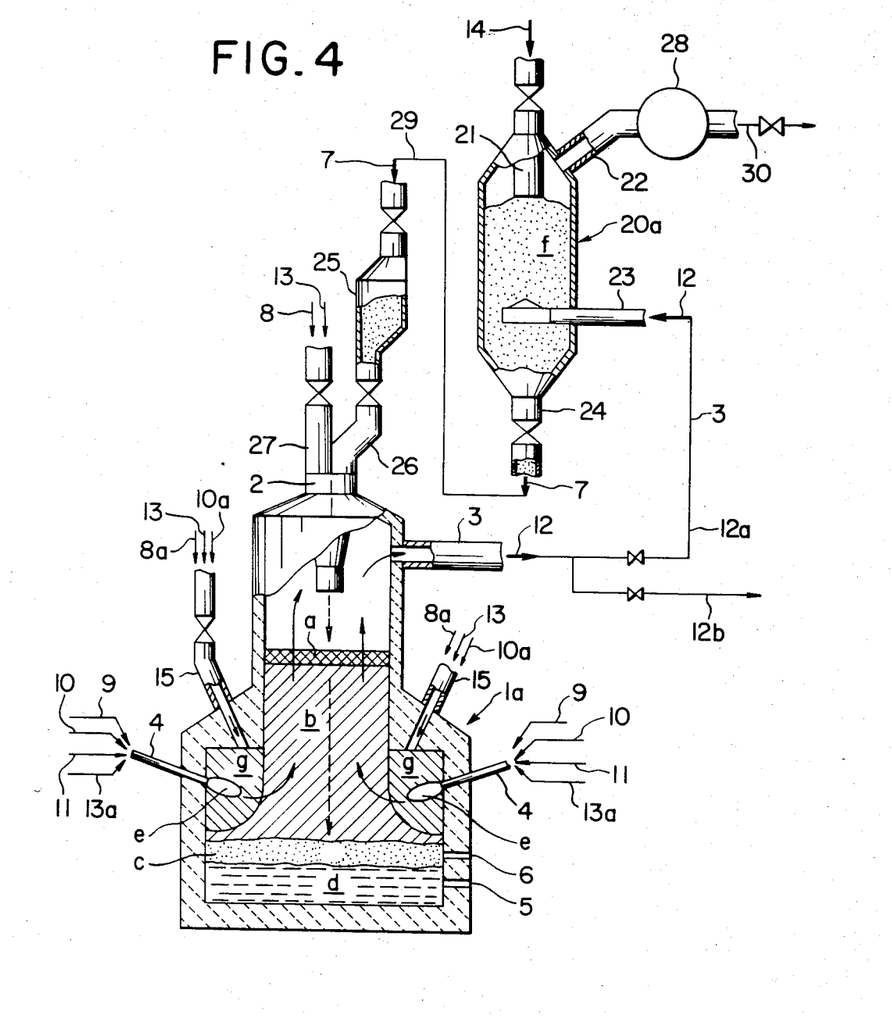
FIG. 4 is one example illustrative of the flow chart of FIG. 3, in which the melting/gasifying furnace of FIG. 2 is applied.

FIG. 4 is a schematical view of the inventive system process (the sixth process) in which a melting/gasifying furnace 1a is combined with a shaft reducing furnace 20a of the moving bed type. Reduced iron 7 discharged through a bottom outlet 24 in the furnace 20a is optionally cooled (not shown), and fed and stored in a hopper 25 through a feed line 29.

Coke 8 is fed from the top inlet 2 through a feed chute 26 into the melting/gasifying furnace 1a, into which are supplied auxiliary materials 13 including a slag-forming material such as limestone and the like through a chute 27.

Depending upon that the gas produced in the melting/gasifying furnace is used as a reducing gas in the shaft reduction furnace or it is used for another purposes, the melting/gasifying furnace is maintained at a high internal pressure ranging from 2 to 5 kg/cm$^2$ or more, preferably about 5 kg/cm$^2$.

The moving bed type shaft reduction furnace 20a is provided therein with a moving bed f. Iron ores or granular iron oxides charged on the top of the bed f is gradually heated and melted by an ascending flow of reducing gas 12 into reduced iron, concurrently, iron ores descends through the moving bed, and is discharged through the bottom outlet 24. The reducing gas passes through a gas outlet 22 and a purifier 28, and is recovered as a by-product gas.

In the case of the static bed type shaft reduction furnace, reduction takes place in a static bed. The shaft reduction furnace, whether it is of the moving bed type or the static bed type, may preferably be provided with a cooling zone in the lower portion, or alternately with an external cooling device, to remove the sensible heat of the discharged reduced iron.

The moving bed type reduction furnace is preferably used since the melting/gasifying furnace can be operated continuously. However, a plurality of the shaft reduction furnaces of the static bed type may optionally be operated in a continuous manner by supplying a successive feed of reducing gas thereinto.

With the arrangement according to the present invention, the reducing gas which has to be separately prepared for the conventional shaft reduction furnace can be prepared in situ, viz., in the melting/gasifying furnace, and recovered at elevated temperature and pressure therefrom, leading to a considerable saving in energy involved as compared with the conventional shaft reduction furnace. Thus, even a certain small-sized furnace according to the present invention can stand comparison with a large-sized blast furnace from the standpoint of thermal efficiency.

Composed mainly of carbon monoxide and hydrogen, and substantially free from $N_2$, the reducing gas formed in the melting/gasifying furnace is a strongly reducing, hot gas, which makes a great contribution to improving the reduction efficiency of the reduction furnace. The pressure of a feed of reducing gas can be adjusted in the melting/gasifying furnace in association with the required pressure of the shaft reduction furnace.

The melting/gasifying furnace is effective not only for melting of reduced iron, but also for direct use of fuels such as coal, coke (particularly of low quality), etc. by combustion and gasification.

The present invention is fundamentally distinguished over the prior art blast furnace process in that a large amount of solid fuel such as pulverized coal or coke breeze or liquid fuel such as heavy oil or tar is, on the one hand, gasified by pure oxygen to melt reduced iron, and the gas recovered from the melting/gasifying furnace is, on the other hand, used as a reducing gas in the shaft reduction furnace to reduce iron ores.

In the inventive arrangement, the melting/gasifying furnace is combined with the shaft reduction furnace in spaced relation for the following reasons.

Like the blast furnace, the present invention contemplates producing pig iron in a stable manner with high efficiency by gas-reduction of iron ores followed by melting. When the gas-reduction and melting of iorn ores as well as the combustion and gasification of coke are carried out in a single reactor as is the case with the blast furnace, the coke and coal receive impact and other loads while they are supplied on the top of the furnace and descend therein, since the interval (height) between the furnace top and the tuyere level amount to about 25 meters. The ores are gas-reduced on the top of the furnace, and melted in the melting section about 20 meters below the furnace top, so that a load of about 25 tons/m$^2$ is applied thereon. Due to such a load, the hot ores under the melting procedure contract to form a layer markedly deficient in permeability, referred to as the cohesive zone, which poses difficulties in descending such as hanging or slipping etc. This is why massive ores which excells in the softening properties at high temperatures and forms no large cohesive zone should be used. The coke also receives impact and other loads similarly and if it deteriorates by the time at which it burns out at the noses of the tuyeres, the permeability encounters obstacles. Thus this is the reason why high-strength coke should be used.

To this end, the present invention resorts to the process in which the ores are first reduced in the shaft reduction furnace, and then melted in the melting/gasifying furnace 1. In the melting/gasifying furnace 1, ores whose softening properties at high temperatures are inferior may be used as well, since the reduced iron is melted with no load in the melting section a positioned above the heating section b formed of the coke-filled layer b. Low-strength coke may be used as well, since the coke charged through the middle openings 16 positioned above the tuyeres burns out rapidly in the combustion zones in front of the tuyeres. Another reason why low-strength coke is applicable is that the coke charged through the top inlet 2 to define the heating section b is consumed only by the carborizing reaction with molten iron and slag, both flowing down through the coke-filled layer, and the reduction reaction of $SiO_2$, etc., thus receiving no loads and impact caused by descending as in the blast furnace.

Other advantages of the inventive fifth and sixth processes are:

1. Blowing of oxygen through the tuyeres of the melting/gasifying furnace permits blowing of a large amount of pulverized coal (which is applicable in amount of 1 up to 1.5 kg per $Nm^3$ of $O_2$) and other fuel. Thus, about 60% or more of the total fuel, i.e., coke for the blast furnace can be replaced by other fuels.

2. Melting of reduced iron causes no deterioration in the coke reaction, thus enabling low-strength or semi-coke to be used as the coke to be charged.

3. The melting/gasifying furnace can be of simple construction and of small size, and the shaft reduction furnace can be reduced in size due to high-calorie reducing gas, thus resulting in lowering in the apparatus cost.

4. High thermal efficiency is obtained due to the fact that the heat transfer takes place from the reducing hot gas to granular reduced iron on the coke-filled layer to melt granular reduced iron in the melting/gasifying furnace, and countercurrent heat exchange between the gas and the ores takes place in the shaft reduction furnace.

5. Little or no fused band is formed in both the shaft reduction furnace as well as the melting/gasifying furnace due to rapid melting of reduced iron. Hence, iron ores or agglomerated ores with a low quality can be used.

6. Even when iron ores of low quality are used, it is possible to obtain granular reduced iron, which has a high metallization of 85 to 96% or more, and can be supplied as such into the melting/gasifying furnace, since the shaft reduction furnace is incorporated.

7. The overall system inclusive of the shaft reduction furnace is stable to operate, and easy to control.

8. The reducing gas recovered from the melting/gasifying furnace can be supplied as such into the shaft reduction furnace, so that separate production and treatment (reforming, treatment for bringing the reducing gas to high pressure and temperature) of the reducing gas are dispensed of, thus leading to a considerable lowering of the energy and cost involved.

Shortly, the arrangement in which the melting/gasifying furnace is separated from the moving bed type reduction furnace makes it possible to apply low-strength coke and low-quality iron ores whose softening properties at high temperatures are inferior.

The reasons for using oxygen and pulverized coal in the melting/gasifying furnace are as follows.

Combustion of pulverized coal varies largely depending upon the combustion temperature and the oxygen concentration of the combustion gas. An 1% increase in the oxygen concentration will result in an about 6% increase in the combustion efficiency. Accordingly, provided that the blast is an amount of air having an oxygen content of about 21% as is the case with the blast furnace, the amount of pulverized coal used per $Nm^3$ of oxygen is limited to about 0.3–0.4 kg. In the present invention, however, it is possible to use pulverized coal in an amount of about 1–1.5 kg per $Nm^3$ of oxygen, thus leading to a considerable reduction in the consumption of coke to be burned.

The gas generate by combustion should have a temperature of at least 1500° C. to melt reduced iron. Consequently in the case of the blast furnace the air to be used should be heated in a blast furnace stove. In the case where oxygen is used as is the case with the present invention, however, the gas produced has a sufficiently high temperature as a result that the amount of the gas produced is limited or reduced per unit combustion reaction. This offers an additional advantage in that no hot stove is required, unlike the blast furnace process.

In addition, oxygen can also be blown in the melting/gasifying furnace by using liquid oxygen as an oxygen source and gasifying it in such a manner that a gas having a pressure of 2–5 $kg/cm^2$ (gauge) is obtained with no need of any blower, the use of which is inevitable in the blast furnace process.

As mentioned above, the present invention provides the following advantages over the blast furnace process: the consumption of energies is reduced, the coke ratio drops considerably; low-quality feeds are used due to the absence of the aforesaid fused band; since the preparation of reduced iron and the melting thereof are carried out in separate furnaces; and the like.

This embodiment of the system process will now be elucidated with reference to Example 4.

EXAMPLE 4

Pig iron is prepared with the combination system of FIG. 4, provided that one melting/gasifying furnace and two moving bed type reduction furnaces are applied. Particulars of the furnaces applied are as follows:

PARTICULARS OF FURNACES

A. Melting/Gasifying furnace
 Effective Furnace Volume: 350 $m^3$
 Number of Tuyeres: 4
 Top Inlet for coke and reduced iron: 1
 Middle inlet for coke, coal and lime stone: 1
 Combustion zones: 4
 Internal Diameter of lower Section: 5 m
 Internal Diameter of Melting Section: 5 m
 Height of Melting Section: 10 m
 Gas Outlet: 1
 Internal Pressure: 3~5 $kg/cm^2$
B. Moving Bed Shaft Reduction Furnace
 Effective Furnace Volume: 150 $m^3$ Internal Diameter: 5 m
Ore Inlet: 1
Gas Inlet (about 10 m below the Ore Inlet): 1
Outlet for reduced iron: 1
Gas Outlet: 1
Internal Pressure: 3~5 kg/cm$^2$ 28 KNm$^3$/hr oxygen, 1 ton/hr steam and 28 tons/hr pulverized coal are blown into the melting/gasifying furnace through the tuyeres. From the middle openings are charged into the combustion zones 10 tons/hr coke (C: 88%, grain size: 40 mm or less, drum index $DI_{15}^{30}=85\%$), 3 tons/hr coal (C: 75%, grain size: 40 mm or less) and 5 tons/hr limestone. Equal amounts of reduced iron are discharged from the reduced iron outlets of the two reduction furnaces to maintain at about 950° C. the temperature of combustion gas leaving the melting/gasifying furnace through the gas outlet. The reduced iron is charged through the reduced iron inlet into the melting/gasifying furnace via the feed line 29. Basic agglomerated ores (T.Fe: 56%, mean grain size: 12 mm) are introduced into the respective reduction furnaces in the amounts corresponding to the reduced iron discharged. Into the melting/gasifying furnace are replenished by charging through the reduced iron inlet 8 tons/hr coke (C: 88%, grain size: 40 mm or more, drum index $DI_{15}^{30}=85\%$), thereby to maintain the upper level of the coke-filled layer forming the heating section of the melting/gasifying furnace at a position 10 meters above the furnace bottom. Equal amounts of combustion gas having a temperature of about 950° C. and leaving the melting/gasifying furnace through the gas outlet are injected into the two moving bed type shaft reduction furnaces. The gas after reduction is recovered through the gas outlet, cooled and de-dusted. The gas is regulated to a pressure of 2 kg/cm$^2$, so that the oxygen injected in the melting/gasifying furnace through its tuyeres attained a pressure of 4.5 kg/cm$^2$. The gas leaving this furnace through the gas outlet amounts to 87.5 KNm$^3$/hr, and has a CO content of 75%, a H$_2$ content of 22% and a pressure of 3.2 kg/cm$^2$. The gases recovered from the two moving bed type reduction furnaces through their gas outlets have a temperature of about 200° C. prior to cooling and de-dusting, and a composition of CO: 39%, H$_2$: 12% and CO$_2$: 36%. The total amount of iron ores fed into each shaft reduction furnace of the moving bed type is 140.8 tons/hr, the amount of reduced iron fed into the melting/gasifying furnace 110.8 tons/hr, the T.Fe 71.1%, and the ratio of metal iron relative to the T.Fe (M.Fe/T.Fe) 85%. The temperature at which the melting/gasifying furnace is charged is about 500° C. The amount of coke fed through the middle openings is 13 tons/hr in total, and the amount of limestone fed therethrough is 4.3 tons/hr in total. The coke supplied into the melting/gasifying furnace through the reduced iron inlet is 8 tons/hr. As a result, the amount of molten pig iron discharged through the molten iron outlet of the melting/gasifying furnace is 83.3 tons/hr, having a composition of C: 4.5%, Si: 0.5%, S: 0.02% or less and other impurities elements: 0.5% in total and a temperature of 1500° C. The slag concurrently discharged amounts to 35 tons/hr.

The foregoing operation is tabulated as follows:

| | |
|---|---|
| Materials required for the production of 1 ton of pig iron Low-quality coke: | 216 kg |
| Coal: | 36 kg |
| Pulverized coal: | 336 kg |
| Oxygen: | 336 Nm$^3$ |
| Steam: | 12 kg |
| Limestone: | 52 kg |
| Iron ores (T.Fe: 56%) | 1690 kg |
| By-product gas of 1664 Kcal/Nm$^3$: | 940 Nm$^3$ |
| Actually consumed energy in the system: | 2568 Mcal |
| Energy for preparing oxygen: | 572 Mcal |
| Total energy: | 3140 Mcal/t |

In this connection, the blast furnace process requires an energy of only about 2800 Mcal per ton of pig iron to be prepared, and seems to be lower than that demanded in the present invention by about 340 Mcal. However, the amount of coke required in the pre-treatment demanding much energy is about 500 kg/t, i.e., roughly double that used in the present invention. In view of the energy consumed in the preparation of coke (the present invention: 260 Mcal, the blast furnace process: 560 Mcal), both processes are considered substantially equivalent. Furthermore, it is evident that the present process is also superior to the blast furnace process in view of the fact that the latter process needs high-quality coke and agglomerated iron ores.

The inventive melting/gasifying furnace can be made in size or height smaller than the blast furnace, and even a certain small-sized furnace according to the present invention can be operated with high efficiency.

As mentioned above, the processes and systems of the present invention are of commercially great value.

What is claimed is:

1. A melting/gasifying furnace for the production of pig iron and the gasification of fuel consisting essentially of:
   (a) a furnace main of the shaft-like form,
   (b) a top inlet for the introduction of reduced iron, coke and auxiliary materials and a gas outlet, which are provided in the top portion of said furnace main,
   (c) outlets for the discharge of molten pig iron and slag provided in the bottom portion of said furnace main,
   (d) a static coke-filled bed packed substantially with coke of the lump form provided in a major portion of said furnace main extending from the bottom of the furnace main up to the upper portion thereof, said bed including therein voids through which gas flows up in countercurrent contact with molten iron and slag which flows down,
   (e) a tuyere or tuyeres for primarily blowing oxygen and fuel primarily comprising carbon and hydrogen, said tuyere(s) being provided in the side wall portion corresponding to the lower region of said coke-filled bed,
   (f) a combustion zone or zones provided in front of said tuyere(s), directed toward the axis of the furnace main, and maintained substantially depletive of air to generate reducing gas,
   (g) a melting section borne on the top of said coke-filled bed and comprising a stock of reduced iron, coke and auxiliary materials charged through said top inlet, the melting section allowing the reducing gas to flow up therethrough to melt therein the reduced iron by the sensitive heat of the reducing gas,
   (h) a hearth formed in the lowermost region of said furnace main, (i) wherein the blown fuel is gasified by the blown oxygen in said combustion zone(s) to generate the reducing gas primarily comprising carbon monoxide and hydrogen, the generated reducing gas flowing up throughout the coke-filled bed and the melting section, with the resultant molten iron and slag flowing down through the coke-filled bed resulting in pig iron to be collected in the hearth and to be discharged therefrom.

2. A melting/gasifying furnace for the production of pig iron and the gasification of fuel consisting essentially of:

(a) a furnace main of the shaft-like form having an upper region of a smaller diameter and a lower region of a larger diameter;

(b) a top inlet for the introduction of reduced iron, coke and auxiliary materials and a gas outlet, which are provided in the top portion of said furnace main;

(c) a hearth and outlets for molten pig iron and slag, which are provided in the bottom portion of said furnace main;

(d) a static coke-filled bed packed substantially with coke of the lump form provided in a major portion of said furnace main extending from the bottom of the furnace main up to the upper region thereof, said coke-filled bed including therein voids through which gas flows up in countercurrent contact with molten iron and slag which flow down;

(e) a tuyere or tuyeres adapted to blow therethrough primarily oxygen and provided in the furnace side wall of the lower region thereof at a level corresponding to the lower region of said coke-filled bed;

(f) a middle opening or openings adapted to feed therethrough solid lump fuel to the front region of said tuyere(s) and provided in the furnace side wall positioned above said tuyere(s) and at the transition region between said upper and lower regions of the furnace main;

(g) a combustion zone or zones which is/are formed of a charge of solid lump fuel fed through said middle opening(s), provided in front of said tuyere(s), directed toward the axis of the furnace main, and maintained substantially depletive of air to generate a reducing hot gas primarily comprising carbon monoxide and hydrogen; and (h) a melting section comprising a stock of reduced iron, coke and auxiliary materials charged through said top inlet, said melting section being borne on the top of said coke-filled bed and allowing the reducing gas to flow up therethrough to melt therein the reduced iron by the sensitive heat of the reducing gas;

(i) wherein the fed fuel is thereby gasified by the blown oxygen in said combustion zone(s) to generate and allow said reducing hot gas to flow up throughout the coke-filled bed and the melting section, with the resultant molten iron and slag flowing down through the coke-filled bed resulting in pig iron to be collected in the hearth and to be discharged therefrom.

3. A furnace combined with a shaft reduction furnace for the production of pig iron consisting essentially of:

(i) a melting/gasifying furnace for the production of pig iron and the gasification of fuel comprising:

(a) a furnace main of the shaft-like form, (b) a top inlet for the introduction of reduced iron, coke and auxiliary materials and a gas outlet, which are provided in the top portion of said furnace main, (c) outlets for the discharge of molten pig iron and slag provided in the bottom portion of said furnace main, (d) a static coke-filled bed packed substantially with coke of lump form provided in a major portion of said furnace main extending from the bottom of the furnace main up to the upper portion thereof, said bed including therein voids through which gas flows up in countercurrent contact with molten iron and slag which flows down, (e) a tuyere or tuyeres for primarily blowing oxygen and fuel primarily comprising carbon and hydrogen, said tuyere(s) being provided in the side wall portion corresponding to the lower region of said coke-filled bed, (f) a combustion zone or zones provided in front of said tuyere(s), directed toward the center of the furnace main, and maintained substantially depletive of air to generate reducing gas, (g) a melting section borne on the top of said coke filled bed and comprising a stock of reduced iron, coke and auxiliary materials charged through said top inlet, the melting section allowing the reducing gas to flow up therethrough to melt therein the reduced iron by the sensitive heat of the reducing gas, (h) a hearth formed in the lowermost region of said furnace main, (i) wherein the blown fuel is thereby gasified by the blown oxygen in said combustion zone(s) to generate the reducing gas primarily comprising carbon monoxide and hydrogen, the generated reducing gas flowing up throughout the coke-filled bed and the melting section, with the resultant molten iron and slag flowing down through the coke-filled bed resulting in pig iron to be collected in the hearth and to be discharged therefrom;

(ii) a shaft reduction furnace for the reduction of iron ores;

(iii) a line for connecting said gas outlet of said melting/gasifying furnace with a reduced gas blowing inlet of said shaft reduction furnace; and (iv) means for feeding reduced iron into said melting-/gasifying furnace, said reduced iron being formed by reducing said iron ores in said shaft reduction furnace with a reducing gas recovered from said melting/gasifying furnace.

4. A furnace combined with a shaft reduction furnace for the production of pig iron consisting essentially of:

(i) a melting/gasifying furnace for the production of pig iron and the gasification of fuel comprising:

(a) a furnace main of shaft-like form having an upper region of a smaller diameter and a lower region of a larger diameter;

(b) a top inlet for the introduction of reduced iron, coke and auxiliary materials and a gas outlet, which are provided in the top portion of said furnace main;

(c) a hearth and outlets for molten pig iron and slag, which are provided in the bottom portion of said furnace main;

(d) a static coke-filled bed packed substantially with coke of the lump form provided in a major portion of said furnace main extending from the bottom of the furnace main up to the upper region thereof, said coke-filled bed including therein voids through which gas flows up in countercurrent contact with molten iron and slag which flows down;

(e) a tuyere or tuyeres adapted to blow therethrough primarily oxygen and provided in the furnace side wall of the lower region thereof at a level corresponding to the lower region of said coke-filled bed;

(f) a middle opening or openings adapted to feed therethrough solid lump fuel to the front region of said tuyere(s) and provided in the furnace side wall positioned above said tuyere(s) and at the transition region between said upper and lower regions of the furnace main;

(g) a combustion zone or zones which are formed of a charged solid lump fuel fed through said middle opening(s), provided in front of said tuyere(s), directed toward the axis of the furnace main, and maintained substantially depletive of air to generate a reducing hot gas primarily comprising carbon monoxide and hydrogen; and (h) a melting section comprising a stock of reduced iron, coke and auxiliary materials charged through said top inlet, said melting section being borne on the top of said coke-filled bed and allowing the reducing gas to flow up therethrough to melt therein the reduced iron by the sensitive heat of the reducing gas;

(i) wherein the fed fuel is thereby gasified by the blown oxygen in said combustion zone(s) to generate and allow said reducing hot gas to flow up throughout the coke-filled bed and the melting section, with the resultant molten iron and slag flowing down through the coke-filled bed resulting in pig iron to be collected in the hearth and to be discharged therefrom;

(ii) a shaft reduction furnace for the reduction of iron ores;

(iii) a line for connecting said gas outlet of said melting/gasifying furnace with a reduced gas blowing inlet of said shaft reduction furnace; and (iv) means for feeding reduced iron into said melting/gasifying furnace, said reduced iron being formed by reducing said iron ores in said shaft reduction furnace with a reducing gas recovered from said melting/gasifying furnace.

5. The furnace as recited in claim 1, 2, 3 or 4, wherein the melting/gasifying furnace includes additional means for blowing steam through said tuyere(s).

6. The furnace as recited in claim 1 or 3 wherein the melting/gasifying furnace includes additional means for blowing fuel primarily comprising carbon and hydrogen through said tuyere(s).

7. The furnace as recited in claim 1, 2, 3 or 4, wherein the melting/gasifying furnace includes additional means for providing powdered slag-forming material into said combustion zone(s).

8. The furnace as recited in claim 2 or 4, wherein the melting/gasifying furnace includes additional means for providing a slag-forming material through the middle opening(s).

9. The furnace as recited in claim 2 or 4, wherein the melting/gasifying furnace further includes means for providing steam into the region of said middle opening(s) or a region adjacent thereto.

10. The furnace as recited in claim 1, 2, 3 or 4, wherein the combustion zone(s) is(are) maintained at a temperature to allow the fuel to gasify substantially within said combustion zone(s).

11. The furnace as recited in claim 1, 2, 3 or 4, wherein said coke-filled bed has a sufficient height such as to allow the generated reducing hot gas to exchange heat with the coke-filled bed and down flowing molten iron and slag, and to allow the molten iron to be carburized during its down flow through the coke-filled layer.

12. The furnace as recited in claim 1, 2, 3 or 4, wherein said melting section is maintained by replenishing said stock.

13. The furnace of claim 1, 2, 3 or 4, in which said coke-filled bed is replenished by charging coke through the top inlet.

14. The furnace as recited in claim 13, in which the coke to be charged is semi-coke or coke.

15. The furnace of claims 1, 2, 3 or 4, in which as the fuel to be blown through said tuyere(s), solid fuel in the powder form, liquid fuel or gaseous fuel, or a mixture of two or more of these fuels is used.

16. The furnace as recited in claim 15, in which the powdery solid fuel is pulverized coal, coke breeze, powdered pitch or the like, or a mixture thereof.

17. The furnace of claim 3 or 4, in which said shaft reduction furnace is of the moving or static bed type, or a combination type thereof.

18. The furnace as recited in claim 17, in which said shaft reduction furnace is of the moving bed type.

19. The furnace of claim 1, 2, 3 or 4, in which said melting/gasifying furnace is operated at a high internal pressure.

20. The furnace of claim 3 or 4, in which the gas recovered from said melting/gasifying furnace is fed into said shaft reduction furnace at a high pressure.

21. The furnace as recited in claim 1 or 3, in which said melting/gasifying furnace comprises an upper region of a smaller diameter and a lower region of a larger diameter.

22. The furnace as recited in claim 1 or 3, in which said combustion zone(s) is/are formed in the lower region of a larger diameter.

23. The furnace as recited in claim 15, in which the furnace further includes means for blowing powdered slag-forming material through said tuyere(s).

24. The furnace as recited in claim 2 or 4, in which said combustion zone(s) in said melting/gasifying furnace is/are formed of a charge of solid lump fuel.

25. The furnace as recited in claim 24, in which said combustion zone(s) is/are formed substantially outside of the lower region of said coke-filled layer within the furnace main.

* * * * *